US010103850B2

(12) United States Patent
Chandra et al.

(10) Patent No.: US 10,103,850 B2
(45) Date of Patent: Oct. 16, 2018

(54) SYSTEM AND METHOD OF USING UNDIRECTIONAL LINKS FOR TAP AGGREGATION

(71) Applicant: Arista Networks, Inc., Santa Clara, CA (US)

(72) Inventors: Subhachandra Chandra, Santa Clara, CA (US); Timur Cheremisov, San Jose, CA (US); Robert Murray Odear, III, Alexandria, VA (US); John Peach, Maidenhead (GB)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/697,536

(22) Filed: Apr. 27, 2015

(65) Prior Publication Data

US 2016/0182194 A1  Jun. 23, 2016

Related U.S. Application Data

(60) Provisional application No. 62/095,576, filed on Dec. 22, 2014.

(51) Int. Cl.
*H04L 1/24* (2006.01)
*H04L 12/935* (2013.01)
*H04L 12/26* (2006.01)

(52) U.S. Cl.
CPC .............. *H04L 1/243* (2013.01); *H04L 43/50* (2013.01); *H04L 49/30* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 5,301,185 A | * | 4/1994 | Cherry | H04L 12/43 370/216 |
| 5,355,124 A | * | 10/1994 | Kochem | H04L 12/42 370/434 |
| 5,398,236 A | * | 3/1995 | Hemmady | H04L 1/22 370/218 |
| 5,515,361 A | * | 5/1996 | Li | H04L 12/44 370/222 |
| 5,636,206 A | * | 6/1997 | Amemiya | H04J 3/14 340/2.7 |
| 5,923,646 A | * | 7/1999 | Mandhyan | H04J 3/085 370/254 |

(Continued)

*Primary Examiner* — Steven H D Nguyen
(74) *Attorney, Agent, or Firm* — Womble Bond Dickinson (US) LLP

(57) ABSTRACT

A method and apparatus of a network element that keeps a port of the network element up in a split port configuration is described. In an exemplary embodiment, the network element receives an indication of a link loss on a receive interface of the port, wherein the port includes the receive interface and a transmit interface. In addition, the receive interface is coupled to a first device over a first link, and the transmit interface is coupled to a second device over a second link. Furthermore, the network element performs an operation of the port such that a link coupled to a transmit interface of the port remains up. The network element additionally suppresses receive faults that are received on the receive interface.

11 Claims, 10 Drawing Sheets

(56) References Cited

U.S. PATENT DOCUMENTS

| | | | |
|---|---|---|---|
| 6,411,598 B1* | 6/2002 | McGlade | H04J 3/14 370/217 |
| 6,414,940 B1* | 7/2002 | Shah | H04J 3/14 370/242 |
| 6,952,396 B1* | 10/2005 | Cottreau | H04L 12/2852 370/222 |
| 9,323,627 B1* | 4/2016 | Kulkarni | H04L 43/10 |
| 2004/0131354 A1* | 7/2004 | Kim | H04J 14/0212 398/3 |
| 2004/0143780 A1* | 7/2004 | DiMambro | G06F 11/2221 714/716 |
| 2005/0008041 A1* | 1/2005 | Wu | H04L 25/14 370/536 |
| 2005/0025060 A1* | 2/2005 | Fike | H04L 43/50 370/248 |
| 2005/0073965 A1* | 4/2005 | Yamauchi | H04L 43/00 370/293 |
| 2006/0072459 A1* | 4/2006 | Knight | G06F 13/385 370/235 |
| 2006/0083259 A1* | 4/2006 | Metcalf | H04L 12/403 370/458 |
| 2007/0140688 A1* | 6/2007 | Patel | H04B 10/077 398/5 |
| 2009/0083464 A1* | 3/2009 | Beckhoff | H04L 12/437 710/110 |
| 2013/0007252 A1* | 1/2013 | Welin | H04L 41/0213 709/223 |
| 2013/0229927 A1* | 9/2013 | Chouinard | H04L 43/50 370/249 |
| 2014/0226459 A1* | 8/2014 | Edmiston | H04J 3/0641 370/216 |
| 2015/0092539 A1* | 4/2015 | Sivabalan | H04L 45/28 370/225 |
| 2016/0080120 A1* | 3/2016 | Unger | H04L 12/462 370/249 |

\* cited by examiner

SYSTEM AND METHOD OF USING UNDIRECTIONAL LINKS FOR TAP AGGREGATION

FIELD OF INVENTION

This invention relates generally to data networking, and more particularly, to using unidirectional links for tap aggregation.

BACKGROUND OF THE INVENTION

A network operator can build a monitoring network so as to get better visibility into application and network performance of this network. The monitoring network further enables improved security, compliance, and reporting for the network operator. To setup the monitoring network, existing switches have passive tap ports that mirror traffic to a tap aggregator. The tap aggregator provides traffic consolidation, source identification, packet processing for elimination of unneeded traffic, and distribution of packets to a data analyzer. The data analyzer analyzes the data sent to it, so as to provide the analysis for the network operator as to the use, security, and performance of the network.

The flow of the data in the monitoring is unidirectional as the data flows from the existing switches to the tap aggregator and to the data analyzer. In this design, each of the switches will be coupled to the tap aggregator through a separate port on the tap aggregator. In addition, the tap aggregator switches the data received from the switches out different ports of the tap aggregator to the data analyzer based on the data characteristics being analyzed by the data analyzer. For example, the tap aggregator can switch the received traffic based on the protocols used for the data, such as source and/or destination headers for Link, Transport and Session layers as well as the potential for arbitrary patterns within datagram headers and/or payloads. Examples could be common protocols and address fields such as MAC and IP addresses, well known protocols such as Hypertext Transfer Protocol (HTTP), File Transfer Protocol (FTP), Secure Shell (SSH) and/or other known protocols.

Because of the unidirectional nature of the traffic flow, the ports of the tap aggregator are being under utilized. For example, a port of the tap aggregator will have a receive and transmit interface, in which the port receives data on the receive interface or transmits data on the transmit interface. For example, the tap aggregator does not use the transmit interface on ports coupled to switches as the tap aggregator does not transmit data to those switches. In addition, the tap aggregator does not use the receive interface on ports coupled to data analyzer as the tap aggregator does not receive data from the data analyzer. Thus, the tap aggregator can potentially not use half of the port interfaces in the monitoring network. This can become expensive for a tap aggregator that uses fiber for the physical connections, because for a situation where only the transmit fiber is actively used, the receive fiber is needed to keep the link up. In this example, the receive fiber is wasted. This problem is compounded if the fiber is a long-distance fiber, which means a long-distance fiber is wasted.

SUMMARY OF THE DESCRIPTION

A method and apparatus of a network element that keeps a port of the network element up in a split port configuration is described. In an exemplary embodiment, the network element receives an indication of a link loss on a receive interface of the port, wherein the port includes the receive interface and a transmit interface. In addition, the receive interface is coupled to a first device over a first link, and the transmit interface is coupled to a second device over a second link. Furthermore, the network element performs an operation of the port such that a link coupled to a transmit interface of the port remains up. The network element additionally suppresses receive faults that are received on the receive interface.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
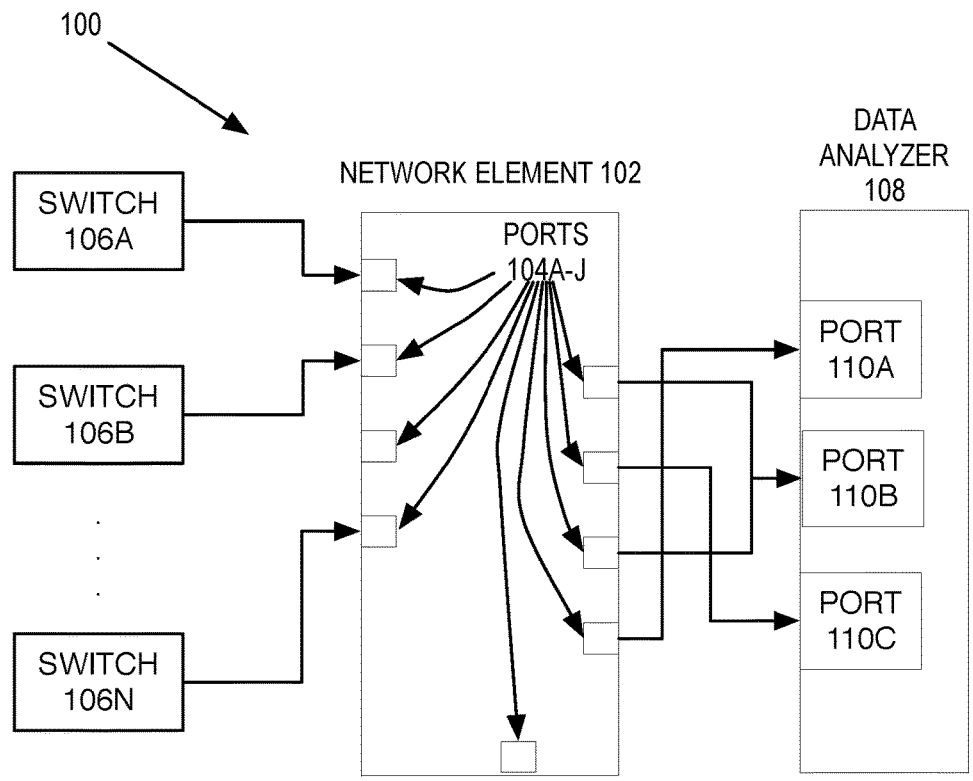
FIG. 1 is a block diagram of one embodiment of a system that aggregates split ports for data analysis.

A method and apparatus of a network element that keeps a port of the network element up in a split port configuration is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that keeps a port of the network element up in a split port configuration is described. In one embodiment, the network element is configured to have a port that is coupled to two different devices or to different ports of the same device. Alternatively, the port can be coupled to the same port of another device, where the receive and transmit interfaces of this port have different states for maintaining each interface (e.g., having independent transmit-receive and receive-transmit paths that are implemented with one pair of physical ports). In this embodiment, the receive and transmit interfaces of the port are coupled to different devices or different ports of the same device. For example and in one embodiment, the receive interface is linked to one device and the transmit interface is linked to another device. Use of this embodiment enables a more efficient use of ports of the network element for unidirectional network application, such as a tap aggregation.

In one embodiment, for a split port configuration, a port will normally bring down the transmit interface if the receive interface identifies a link down or receives receive faults. In this embodiment, in order to keep the transmit interface up and transmitting data, the network element performs an internal loopback from the transmit interface to the receive interface if the receive interface identifies a link down. The internal loopback will keep the transmit interface up when the receive interface is down due to a link loss. In addition, the network element drops the data used for the internal loopback because this data is not meant to be communicated with other devices.

In another embodiment, the network element suppresses receive faults. In this embodiment, a device with a port transmission interface coupled to a receive interface of the network element may not have the corresponding receive interface coupled to another device. For example and in one embodiment, a tap port of a switch transmits to the tap aggregator port, where that tap aggregator port does not transmit back or is linked to the switch tap port. Instead, the transmit interface of the tap aggregator is coupled to a port of the data analyzer. In this example, the switch tap port does not have a link on the receive interface. Because of this the switch tap port sends receive faults to the receive interface of the tap aggregator. Without a further operation, the tap aggregator would bring down this transmit interface. Because the transmit interface of the tap aggregator port transmit to a different device (e.g., the data analyzer), the tap aggregator suppresses the receive faults, so the tap aggregator port transmit interface stay up.

FIG. 1 is a block diagram of one embodiment of a system 100 that aggregates split ports for data analysis. In one embodiment, system 100 includes switches 106A-N, which are coupled to network element 102. In addition, the network element 102 is coupled to data analyzer 108. In one embodiment, network one element 102 is a tap aggregator that taps ports on switches 106A-N and switches the data from these ports to the data analyzer one away. In one embodiment, a tap aggregator provides traffic consolidation, source identification, packet processing for elimination of unneeded traffic, and distribution of packets to a data analyzer. The network element 102 switches the received data based on the characteristics of the data to be analyzed by the data analyzer 108. In one embodiment, the data analyzer 108 is a device that analyzes data sent to the data analyzer 108. The data analyzer 108 analyzes the data sent to it, so as to provide the analysis for the network operator as to the use, security, and performance of the network. In this embodiment, data sent on each port is analyzed based on different characteristics (e.g., source and/or destination headers for Link, Transport and Session layers as well as the potential for arbitrary patterns within datagram headers and/or payloads. Examples could be common protocols and address fields such as MAC and IP addresses, well known protocols such as HTTP, FTP, SSH and/or other known protocols). In one embodiment, each of the switches 106A-N is a switch that forwards traffic based on one or different protocols (layer 2 switching, layer 3 routing, or another type of forwarding based on header information stored in the data packets of the traffic). In one embodiment, each of the switches 106A-N can be a physical or virtual switch. In another embodiment, one or more of the switches 106A-N can be different types of sources (e.g., a passive, active, or virtual device that provides some or all of the traffic of interest). In one embodiment, one or more of the switches 106A-N can have a source that is a mirroring from network devices (e.g., traffic copied to a mirror destination or 'monitor' port or active/passive in-line taps (e.g., 'test access points') which themselves have no packet manipulation intelligence function and copy traffic towards network element 102. In one embodiment, the passive tap can be an optical tap. In another embodiment, the passive tap can be changes for mirroring functions.

In one embodiment, the data flow from switches 106A-N to network element 102 and to data analyzer 108 is unidirectional. In this embodiment, the unidirectional dataflow means that the data is flowing in one direction namely from switches 106A-N to network element 102 and to data analyzer 108. Because of the nature of this network arrangement, the data does not flow in the opposite direction. In one embodiment, the network element 102 includes ports 104A-J. Each of these ports 104A-J, will include receive and transmit interfaces. Because of the unidirectional dataflow in this embodiment, half of the port interfaces will go unused. For example and in one embodiment, the transmit interfaces for ports 104A, B, and D will go unused as the network element 102 does not transmit data to switches 106A, B, and D. In addition, the receive interfaces for ports 104E-H will go unused because the network element 102 does not receive data from the data analyzer 108.

Because, in this embodiment, half of the port interfaces potentially could go unused, it would be useful if a port could be coupled to two different devices. For example and in one embodiment, it would be useful if port 104A could be coupled to switch 106A and data analyzer 108. In this example, the receive interface of port 104A would be coupled to switch 106A and the transmit interface of port 104A would be coupled to the data analyzer 108. This would, in effect, split a bidirectional port into two unidirectional ports and potentially doubling the number of ports on the network element 102. In one embodiment, to accomplish this, the operation of the receive and transmit interfaces for each port would have to be changed to accommodate the new environment in which the ports are being used. In one embodiment, a split port is a port with the receive and transmit interfaces coupled to different devices, or alternatively, to different ports on the same device. Thus, a port configured as a split port does not have both links going to the same port on one device does not couple the state of its transmit path with its receive path.

In one embodiment, if a port is coupled to two different devices (or alternatively, two different ports of the same device), the transmit interface of that port is kept up if the receive interface of that port encounters a link down. In an alternative embodiment, if a port is coupled to two different devices (or alternatively, two different ports of the same device), the network element 102 suppresses receipt of receive faults on the receive interface of that port. The operations of the transmit and receive interfaces that are coupled to two different devices (or alternatively to two different ports of the same device) is further described in FIGS. 2-6 below.

Figure 2:
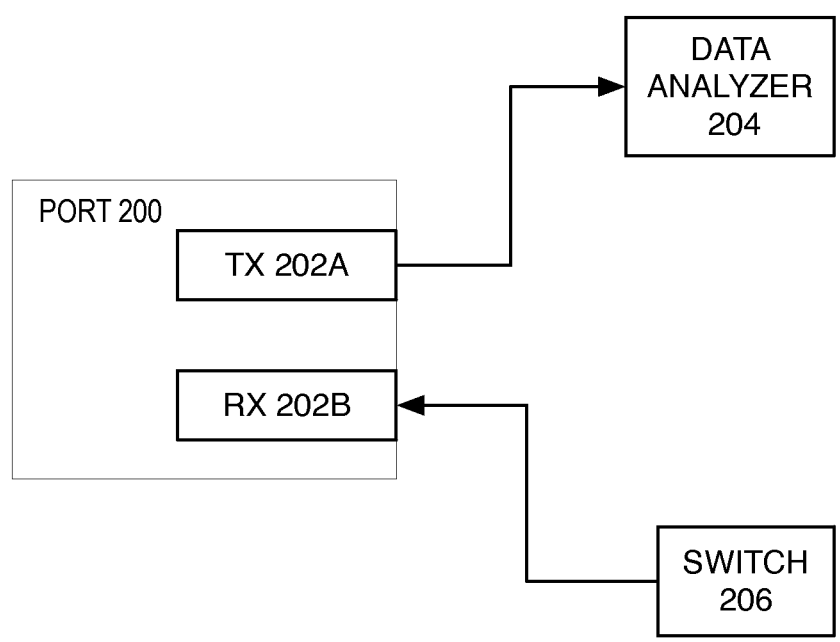
FIG. 2 is a block diagram of one embodiment of a split port.

As described above, a port of the network element 102 can be coupled to two different devices. For example and in one embodiment, one of the ports can be transmitting to a port of the data analyzer 108 and receiving data from one of the switches 106A-N. In this example, this port is configured to be a split port. FIG. 2 is a block diagram of one embodiment of a split port 200. In FIG. 2, port 200 includes transmit interface 202A and receive interface 202B. In one embodiment, these interfaces 202A-B are coupled to the data analyzer 204 and switch 206, respectively. In this embodiment, the interfaces 202A-B are coupled to data analyzer 204 and switch 206 using one or more different media and protocols (e.g., copper, optic fiber, Ethernet, wireless, Synchronous Optical Networking (SONET), Fiber channel, Infiniband, or some other media connections and protocol).

In one embodiment, if one of the links between port 200 and data analyzer tool 204 or switch 206 goes down, the port will take down the other link. However, in this split port arrangement, the other link should stay up, because the other link is communicating data with a different device. For example and in one embodiment, if the receive link for receive interface 202B goes down (e.g., switch 206 goes down, link cut, or other type of link loss), the link between the transmit interface 202A and data analyzer 204 should stay up. In one embodiment, the port 200 performs an internal loopback between the transmit 202A and receive 202B interfaces so as to keep the transmit interface 202A up and transmitting data to the data analyzer 204. Performing the internal loopback is further described in FIGS. 3 and 5 below.

Figure 3:
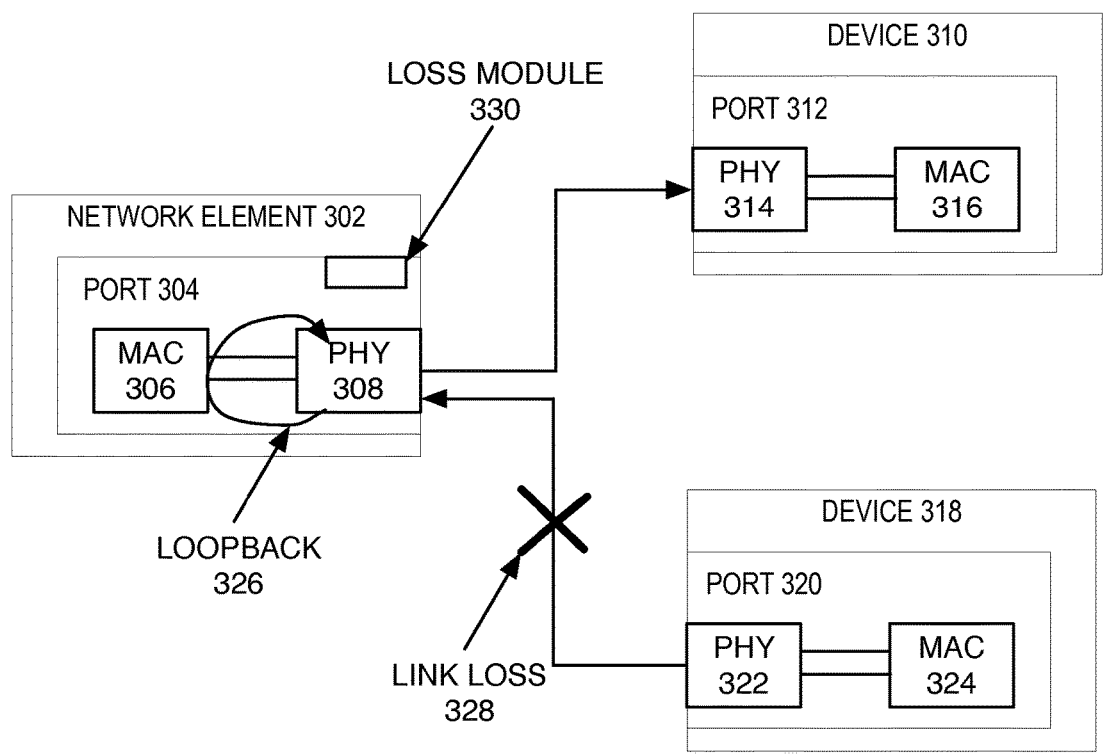
FIG. 3 is a block diagram of one embodiment of a split port with a link loss to the receive port.

FIG. 3 is a block diagram of one embodiment of a system 300 with a split port 304 with a link loss to the receive port. In one embodiment, the network element 302 includes port 304, which is coupled to devices 310 and 318. In this embodiment, port 304 is transmitting data to device 310 and receiving data from device 318. In one embodiment, port 304 includes MAC layer 306 and PHY layer 308. In this embodiment, the PHY layer 308 is the physical layer for the data packet (e.g., layer 1) and the MAC layer 306 is the media access control (MAC) layer for the data packet (layer 2). In one embodiment, the MAC layer 306 prepares packets for transmission by breaking the packet data into data frames and passing the data frames to PHY layer 308. PHY layer 308 maintains the integrity of integrity of the data frames transmitted and received. In addition, the PHY layer 308 physically transmits and receives the data frames. In addition, port 304 includes loss module 330. In one embodiment, there is a link loss 328 between the PHY layer 308 of the port 304 and the device 318. In this embodiment, the link loss 328 can be due to a variety of reasons (e. g., device 318 goes down, the device reboots, there is maintenance on the device, the link is cut, the link is unplugged, or some other link loss).

In one embodiment, in order to keep the link up between network element 302 and device 310, the loss module 330 performs a loopback 326 to keep up the transmission interface of PHY layer 308. In this embodiment, without the loopback 326, the transmission interface of the PHY layer 308 would be brought down as a result of the link loss 328. In one embodiment, the use of the loopback 326 allows the transmission interface of the PHY layer 308 to stay up. In this embodiment, putting port into loopback mode is not always necessary. In another embodiment, an application-specific integrated circuit (ASIC) could support forcing link state to be UP even when receive signal is not present. If a loopback used, then the loopback could be in internal MAC or PHY, or external MAC or PHY, depending on the type of platform used. In addition, and in this embodiment, the port 304 drops the data that was used for the loopback 326, as this data is used to keep the transmission interface up and is not meant to be communicated to another device. In one embodiment, device 310 includes port 312, where port 312 includes PHY layer 314 and MAC layer 316. In one embodiment, device 318 includes port 320, where port 320 includes PHY layer 322 and MAC layer 324.

Figure 4:
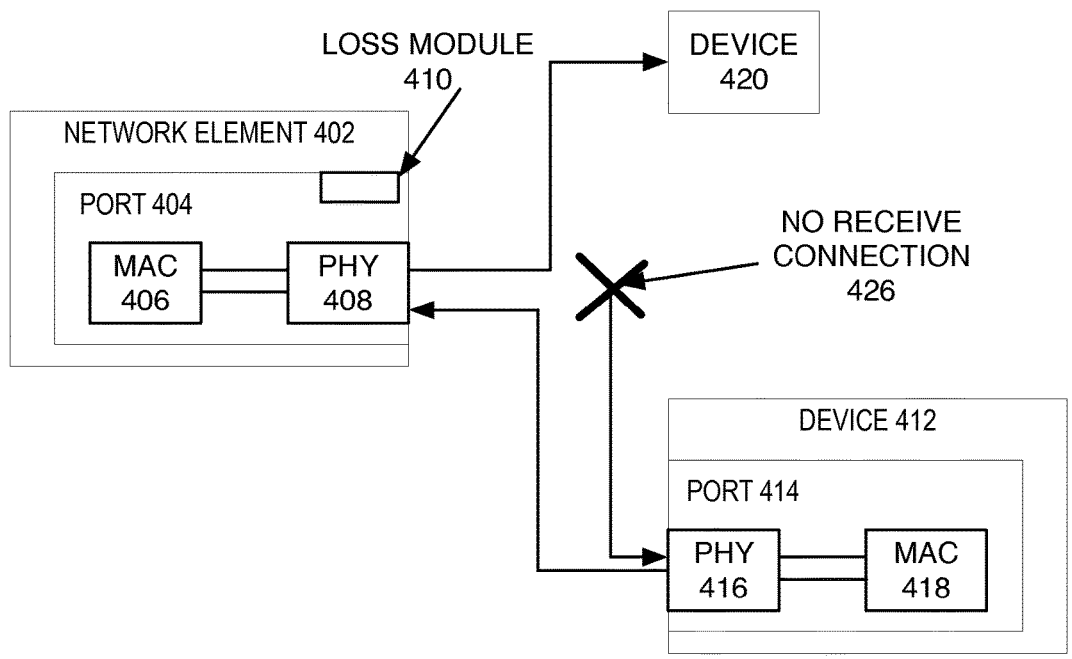
FIG. 4 is a block diagram of one embodiment of a system with a split port where a remote device does not have a receive connection.

FIG. 4 is a block diagram of one embodiment of a system 400 with a split port 404 where a remote device 412 does not have a receive connection 426. In FIG. 4, the network element 402 includes port 404, which is coupled to device 412. In this embodiment, port 404 is receiving data from device 410 and transmitting data to device 420. In one embodiment, port 404 includes MAC layer 406 and PHY layer 408, which is similar to the MAC layer 306 and PHY layer 308 described in FIG. 3 above. In one embodiment, device 412 includes port 414, where port 414 includes PHY layer 416 and MAC layer 418.

In one embodiment, device 412 transmits data to the network element 402 on port 414, but is not receiving data on port 414, because there is no receive connection 426. In this embodiment, the device 412 send receive faults to the network element 402. In one embodiment, the receive faults indicate to the receiving network element (e.g., network element 402) to bring down the transmission interface. Thus, the network element 402, upon receiving the receive faults on port 404, is supposed to bring down the transmission interface and stop transmitting data for device 420. However, the loss module 410 suppresses these faults, which allows port 404 to continue transmitting data to another device.

Figure 5:
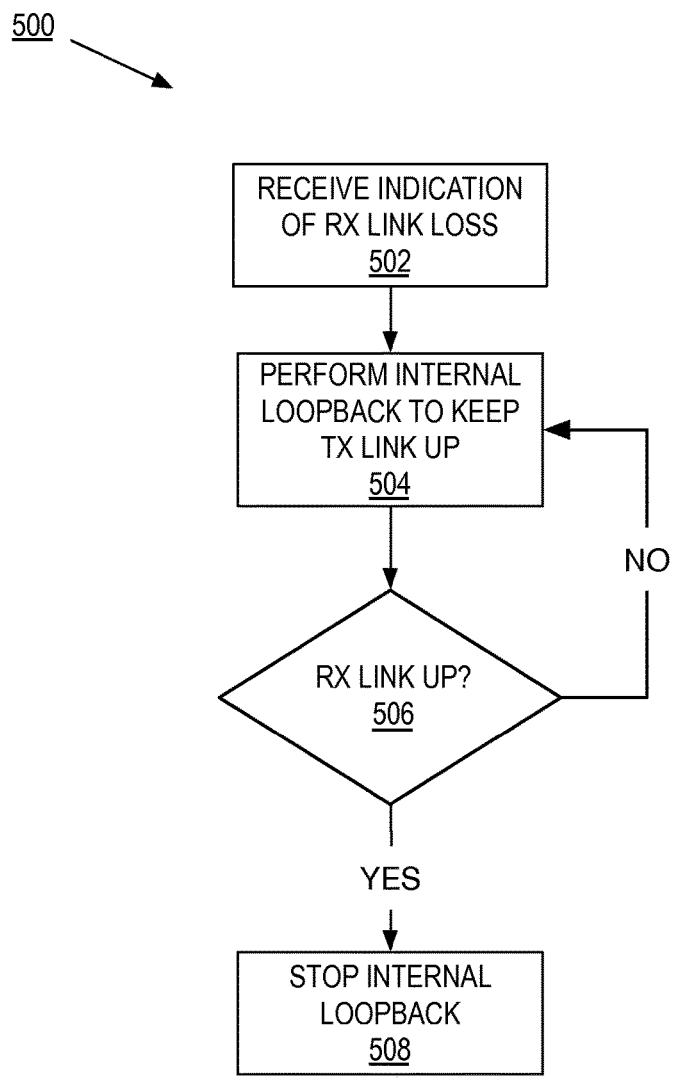
FIG. 5 is a flow diagram of one embodiment of a process to handle a receive port link loss for a split port.

As described above, in a split port configuration, a port can bring down a transmit interface if the receive interface encounters a link loss. FIG. 5 is a flow diagram of one embodiment of a process 500 to handle a receive port link loss for a split port. In one embodiment, process 500 is performed by a loss module, such as loss module 330 as described in FIG. 3 above. In FIG. 5, process 500 begins by receiving an indication of a receive interface link loss for a port at block 502. In one embodiment, process 500 receives the receive interface link loss because a small form-factor pluggable (SFPs) will have a receive loss of signal (RX LOS) signal coming out of the SFP. The signal goes high when receive signal loss is detected. In this embodiment, a RX_LOS signal from SFP goes to a status control module, where the status control module can raise an interrupt in CPU to indicate RX signal loss. In another embodiment, the RX_LOS signal goes directly into the PHY or switching ASIC and indication of loss of signal can be polled by reading a PHY or ASIC register.

At block 504, process 504 performs an internal loopback on the port to keep the transmit link up. In one embodiment, process 500 sends data from the transmit interface of the port to the receive interface (e.g., the loopback data is not physically transmitted out the transmission interface). In one embodiment, this transmission of data is internal to the port. In addition, process 500 drops the data used for the loopback, as this data is meant to keep up the transmission interface up and not to be communicated with other devices. At block 506, process 500 determines if the receive interface is back up. In one embodiment, process 500 determines that the receive interface is back up by detecting the RX LOS signal go low when the RX signal is restored. If the receive interface is back up, process stops the internal loopback at block 508. If the receive interface is not back up, execution proceeds to block 504, where process 500 continues to perform the internal loopback.

Figure 6:
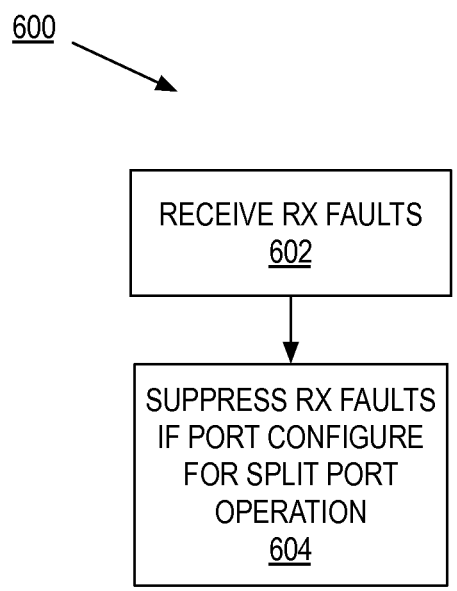
FIG. 6 is a flow diagram of one embodiment of a process to handles receive faults for a split port.

In addition to handling a receive interface link loss, a port may bring down a transmit interface if the port receives receive faults. FIG. 6 is a flow diagram of one embodiment of a process 600 to handle receive faults in a split port. In one embodiment, process 600 is performed by a loss module, such as loss module 410 as described in FIG. 4 above. In FIG. 6, process 600 beings by receiving receive faults at block 602. In one embodiment, process 600 receives the receive faults if the device coupled to the network element performing process 600 does not have an active transmission link or loses the transmission link. For example and in one embodiment, device 418 sends receive faults to the network element 402 as described in FIG. 4 above. At block 604, process 600 suppresses the receive faults if the device performing process 600 has the receiving port configured for a split port operation (e.g., the receive and transmit interface of the port are coupled to different devices or the same device with different ports). For example and in one embodiment, if the device receives and transmits data to different devices, process 600 suppresses the receive faults. Without suppressing the receive faults, the device performing process 600 would bring down the transmission interface of the port.

Figure 7:
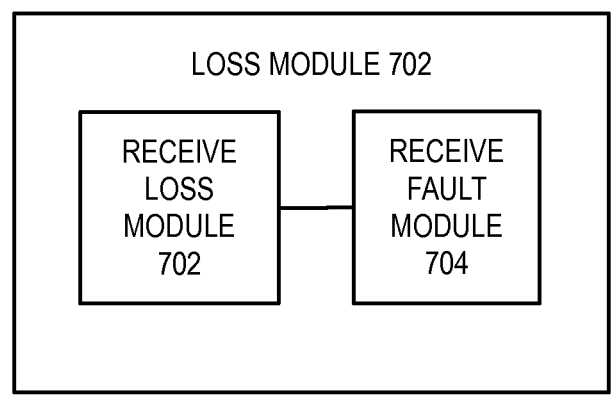
FIG. 7 is a block diagram of one embodiment of a loss module that handles a split port.

FIG. 7 is a block diagram of one embodiment of a loss module 700 that handles a split port. In one embodiment, loss module 700 is loss module 330 or 410 as described in FIG. 3 or 4, respectively. In one embodiment, loss module 700 includes a receive loss module 702 and receive fault module 704. In one embodiment, the receive loss module 702 handles a receive port link loss as described in FIG. 5 above. The receive fault module 704 handles receive faults as described in FIG. 6 above.

Figure 8:
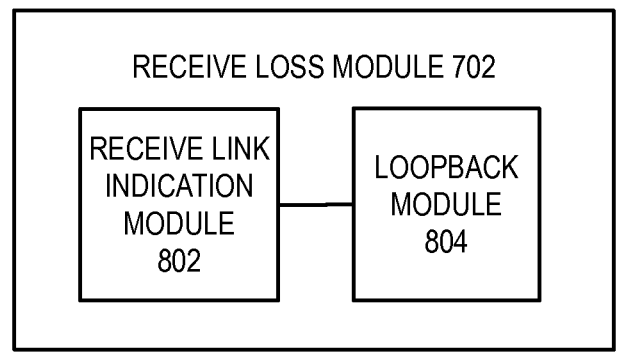
FIG. 8 is a block diagram of one embodiment of a receive loss module that handles a receive port link loss for a split port.

FIG. 8 is a block diagram of one embodiment of a receive loss module 702 that handles a receive port link loss for a split port. In one embodiment, the receive loss module 702 includes receive link indication module 802 and loopback module 804. In one embodiment, the receive link indication module 802 determine link status of the receive interface as described in FIG. 5, blocks 502 and 506 above. The loopback module 804 performs the loopback for the port as described in FIG. 5, blocks 504 and 508 above.

Figure 9:
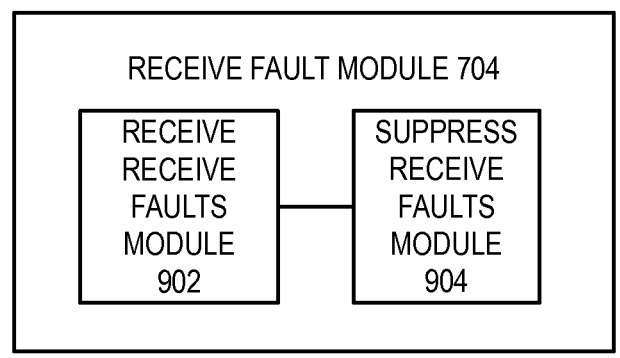
FIG. 9 is a block diagram of one embodiment of a receive fault module that handles receive faults for a split port.

FIG. 9 is a block diagram of one embodiment of a receive fault module 704 that handles receive faults for a split port. In one embodiment, the receive fault module 704 includes a receive faults module 902 and suppress receive faults module 904. In one embodiment, the receive faults module 902 receives the receive faults as described in FIG. 6, block 602 above. The suppress receive faults module 904 suppresses the receive faults as described in FIG. 6, block 604 above.

Figure 10:
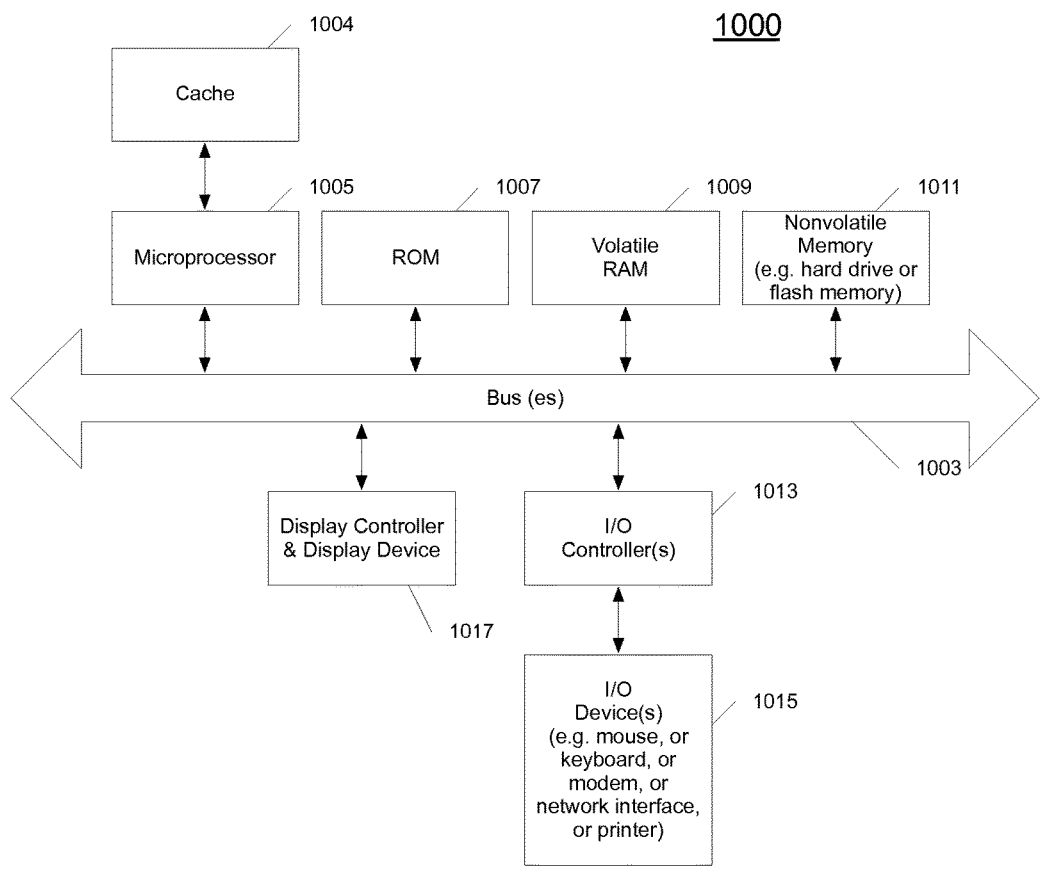
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a network element 102 as shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. In one embodiment, the system 1000 includes a plurality of network interfaces of the same or different type (e.g., Ethernet copper interface, Ethernet fiber interfaces, wireless, and/or other types of network interfaces). In this embodiment, the system 1000 can include a forwarding engine to forward network date received on one interface out another interface.

Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

Figure 11:
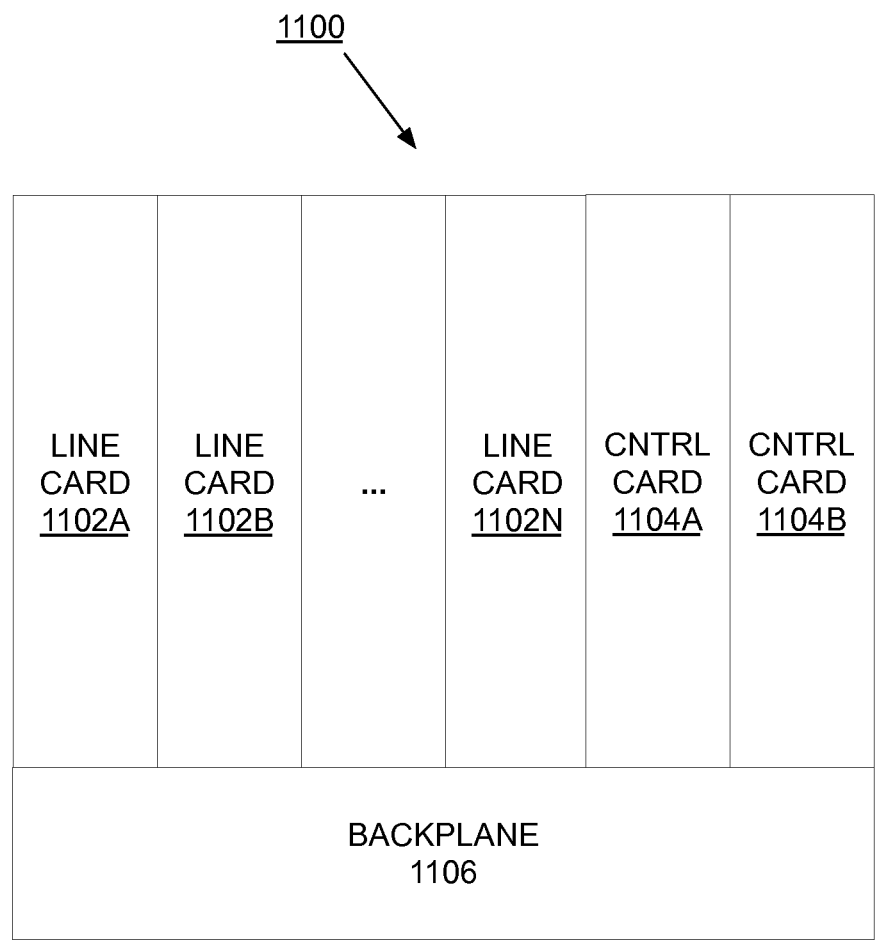
FIG. 11 is a block diagram of one embodiment of an exemplary network element that handles a split port.

The mass storage 1011 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1011 will also be a random access memory although this is not required. While FIG. 11 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 11 is a block diagram of one embodiment of an exemplary network element 1100 that handles a split port. In FIG. 11, the backplane 1106 couples to the line cards 1102A-N and controller cards 1104A-B. While in one embodiment, the controller cards 1104A-B control the processing of the traffic by the line cards 1102A-N, in alternate embodiments, the controller cards 1104A-B, perform the same and/or different functions (e.g., processes changes to forwarding information, etc.). In one embodiment, the line cards 1102A-N process and forward traffic according to the network policies received from controller cards the 1104A-B. In this embodiment, one, some, or all of the line cards 1102A-N includes a loss module to handle a split port in this network element 1100, such as the loss module 330 or 410 as described in FIGS. 3 and 4 above. It should be understood that the architecture of the network element 1100 illustrated in FIG. 11 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "performing," "computing," "adding," "dropping," "suppressing," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A network element including a non-transitory machine-readable medium having executable instructions to cause one or more processing units to perform a method to keep a port of a network element up in a split port configuration, the method comprising:
   receiving an indication of a link loss on a receive interface of the port, wherein the port is a bidirectional port that includes the receive interface and a transmit interface, and the receive interface is coupled to a port of a first device and the transmit interface is coupled to port of a second device;
   in response to receiving the indication of the link loss, performing an operation of the port such that a transmit link coupled to a transmit interface of the port remains up despite the link loss indication received on the receive interface of the port, wherein the performing the operation comprises, performing a loopback internal to the port.

2. The network element of claim 1, wherein the internal loopback is a loopback of data between the receive and transmit interfaces within the port.

3. The network element of claim 1, wherein the method further comprises:

dropping the loopback data.

4. The network element of claim 1, wherein the method further comprises:

stopping the internal loopback if the link loss on the receive interface is repaired or back up.

5. The network element of claim 1, wherein the network element is a tap aggregation network element.

6. The network element of claim 1, wherein the second device is a data analyzer and a flow of network data from the first device to the data analyzer is unidirectional.

7. The network element of claim 6, wherein the flow of network data includes network data that is mirrored from network data transmitted by the second device.

8. A network element including a non-transitory machine-readable medium having executable instructions to cause one or more processing units to perform a method to keep a port of a network element up in an event of a fault indication, the method comprising:

receiving a receive fault indication on a receive interface of the port; and in response to receiving the fault indication on the receive interface of the port, suppressing the receive fault indication; and transmitting data on a transmit interface of the port, wherein the receive interface is coupled to a first device and the transmit interface is coupled to a second device, and the first and second device are different devices.

9. A network element that keeps a port of a network element up in a split port configuration, the network element comprising:

the port that is a bidirectional port and including a receive interface and a transmit interface, the receive interface is coupled to a first link and the port receives an indication of a link loss on receive interface; and a set of instructions stored in memory coupled to the port that, in response to receiving the indication of the link loss, performs an operation of the port such that a transmit link coupled to a transmit interface of the port remains up despite the link loss indication received on the receive interface of the port, wherein the performing the operation comprises, performing a loopback internal to the port.

10. The network element of claim 9, wherein the internal loopback is a loopback of data between the receive and transmit interfaces within the port.

11. The network element of claim 9, wherein the loss module further drops the loopback data.

* * * * *